Jan. 9, 1968     H. BARKER ETAL     3,362,861
METHOD OF MAKING ELECTRICAL INSULATION OF WOUND
LAYERS OF PAPER AND DRY RESIN FILM
Filed April 21, 1965     2 Sheets-Sheet 1

INVENTORS
HARRY BARKER
KENNETH ROTHWELL
BY
WATSON, COLE, GRINDLE + WATSON
ATTORNEYS

Jan. 9, 1968   H. BARKER ETAL   3,362,861
METHOD OF MAKING ELECTRICAL INSULATION OF WOUND
LAYERS OF PAPER AND DRY RESIN FILM
Filed April 21, 1965   2 Sheets-Sheet 2

INVENTORS
HARRY BARKER
KENNETH ROTHWELL
BY
WATSON, COLE, GRINDLE & WATSON
ATTORNEYS

United States Patent Office 3,362,861
Patented Jan. 9, 1968

3,362,861
METHOD OF MAKING ELECTRICAL INSULA-
TION OF WOUND LAYERS OF PAPER AND
DRY RESIN FILM
Harry Barker and Kenneth Rothwell, Northumberland,
England, assignors to The Bushing Company Limited,
Durham, England, a company of Great Britain
Filed Apr. 21, 1965, Ser. No. 449,844
Claims priority, application Great Britain, Apr. 21, 1964,
16,509/64; Sept. 2, 1964, 35,945/64
13 Claims. (Cl. 156—53)

ABSTRACT OF THE DISCLOSURE

This invention relates to electrical insulation for use with high voltages, the insulation being composed of alternate layers of electrically insulating paper and phenoxy resin. The insulation is formed by winding onto a former alternate layers respectively of electrically insulating paper and of a dry flexible film of phenoxy resin to form a laminate. The laminate is then consolidated by applying heat and pressure causing the resin film to melt and bond the adjacent paper layers together.

Figure 1:
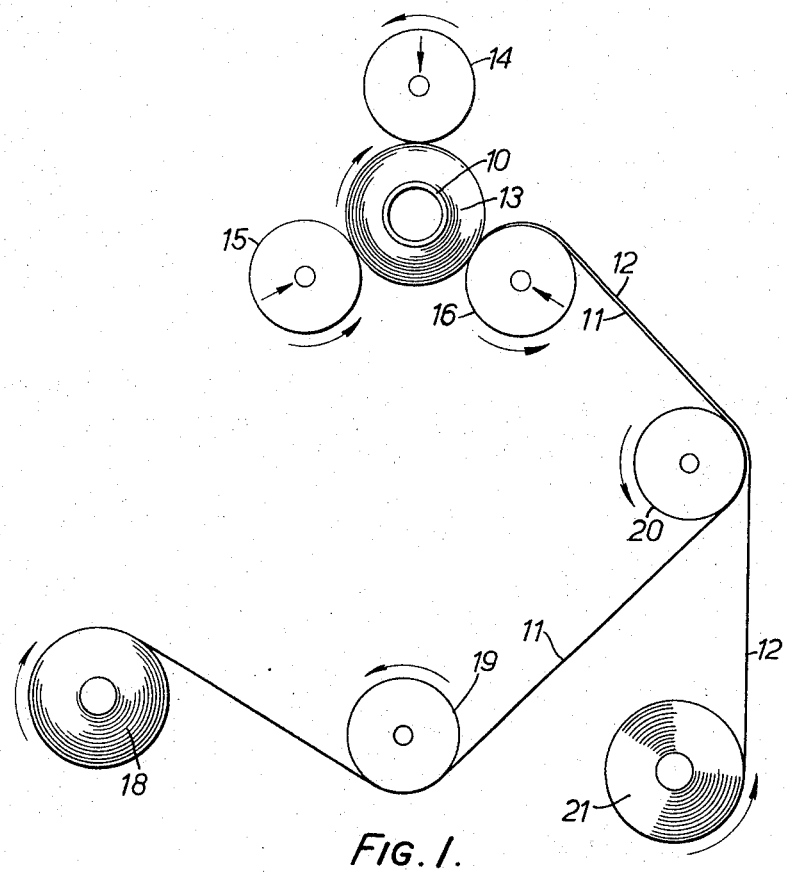

This invention relates to resin-bonded laminated-paper electrical insulators and solid insulation, and particularly although not exclusively to lead-in bushings and other tubular insulation for use at high voltages and made of wound paper bonded with synthetic resin adhesive.

According to the present invention, a method of making a resin-bonded paper insulator or insulation, for example a bushing, comprises introducing the resin adhesive in the form of a thin, dry, flexible film between adjacent superimposed layers of paper and bonding the resin film to the opposed surfaces of the paper layers by the application of heat and pressure.

The film is preferably made of a synthetic resin having a molecular structure such that when melted by the application of heat it will not penetrate into more than a minor proportion of the total thickness of either of the adjacent paper layers. This characteristic of inability to penetrate into the pores of a sheet of absorbent electrical paper is a characteristic of certain resins having a high molecular weight and a large molecular size. Resins of low molecular weight when in liquid form will invariably penetrate fully through the thickness of a paper sheet to which they are applied.

As explained in the present applicant's copending British patent application No. 47,565, if full penetration of the liquid resin into the layers of a resin-bonded laminated-paper insulation can be prevented, the unimpregnated part of each layer of paper retains a degree of resilience derived from its dried-air-filled pores to a sufficient extent to accommodate the chemical and thermal contractions which take place in even a thin adhesive coating of resin during curing. If however the paper is completely impregnated with liquid resin, this natural give will be destroyed and the insulation is liable to crack during and after curing.

In one form of the present invention a method of manufacturing a resin-bonded laminated-paper electrical bushing insulator or other tubular insulator comprises winding simultaneously onto former superimposed sheets or tapes respectively of electrical paper and of a dry, flexible film of synthetic resin adhesive so that the adhesive film is interposed between adjacent turns of the paper winding, and applying heat and pressure to the exterior of the winding as it is progressively built up on the former, for example by means of one or more heated pressure rollers, to cause the film to melt partially and bond to the paper, the resin of the film having a molecular structure such that when melted it will not penetrate into more than a minor proportion of the total thickness of each turn of the paper winding.

Various forms of syntheic resin in film form have been found suitable for use as the adhesive film, and one preferred type of resin is a thermoplastic resin of the phenoxy class. Phenoxy resins are classified as high-molecular-weight (approximately 30,000) polyhydroxy ethers whose raw materials are bisphenol A and epichlorohydrin. The repeating unit of the molecule is

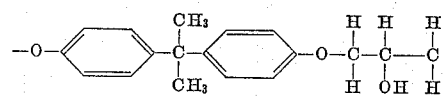

However other high-molecular-weight resins may also be employed as the adhesive film, for example a thermosetting resin in film form. For example a film of an epoxy resin modified with nylon, and possibly containing a catalyst, and/or a plasticiser, may be used.

In another form, the invention comprises a method of manufacturing an angled or curved wound bushing or other wound tubular or annular insulator or insulation, which comprises winding in succession onto a correspondingly-angled or curved electrical conductor or other former groups of one or several successive layers of helically-wound butt-lapped or overlapped plain or crepe paper tape, alternating with groups of one or several successive layers of helically-wound butt-lapped or overlapped dry flexible tape comprising a synthetic resin adhesive, introducing metallic layers into the composite winding during its formation at predetermined radial spacing if required, and consolidating the winding by the application of heat and pressure to bond the successive layers or groups of layers together, either by covering the winding and baking the covered insulation in a heated vessel under a super-atmospheric gas pressure, or under a vacuum, or by applying heated pressure rollers to the winding during its formation.

The invention according to another of its aspects comprises a straight, curved or angled resin-bonded laminated-paper electrical bushing insulator or other tubular wound-paper insulator made by any of the various methods referred to, in which the adhesive is introduced in the form of a dry, flexible film during winding and heated under pressure to bond the paper layers together.

As well as being applicable in the manufacture of bushings and other resin-bonded wound-paper tubular insulators, the invention may also be used with advantage in the manufacture of panels, sheets, tubes and blocks of resin-bonded laminated-paper insulation.

Figure 2:
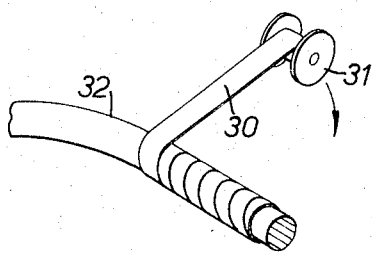

The invention may be carried into practice in various ways, but certain specific embodiments will now be described by way of example only with reference to the accompanying drawings, in which FIGURE 1 is a diagram of a winding installation for the formation of straight bushings from interleaved paper sheet and resin film wound simultaneously, FIGURE 2 is a view of a short length of a curved bushing conductor showing the winding thereon of a layer of dry flexible synthetic resin tape.

Figure 3:
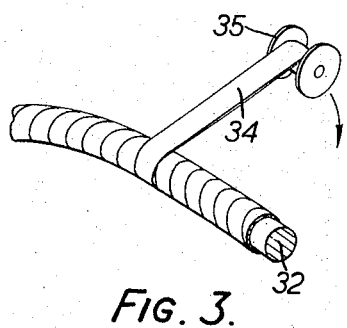
Figure 4:
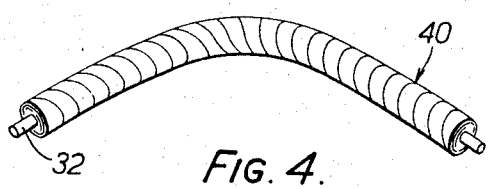
Figure 5:
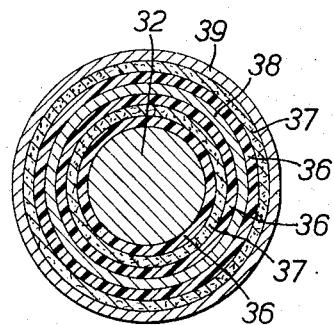
Figure 6:
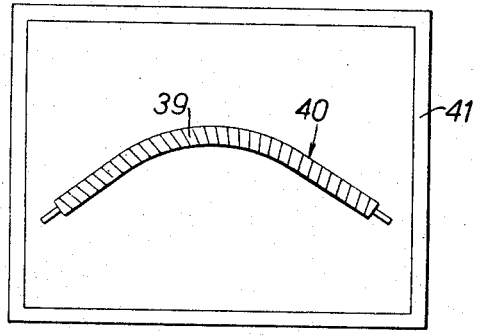
Figure 7:
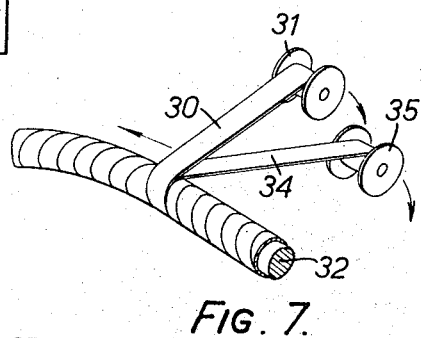
Figure 8:
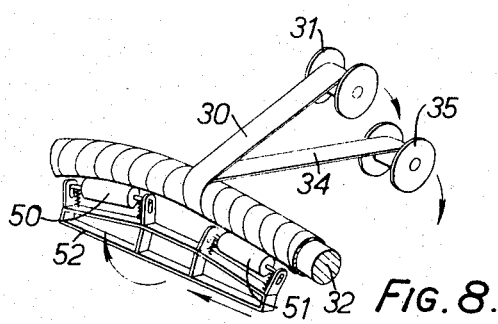

FIGURE 3 shows the bushing length of FIGURE 2 during the subsequent winding thereon of a layer of dry flexible paper tape, FIGURE 4 shows the completely-wound curved bushing of the embodiment of FIGURES 2 and 3, FIGURE 5 is a cross section of the bushing of FIGURE 4, FIGURE 6 shows diagrammatically the covered bushing of FIGURES 4 and 5 being baked in an oven, FIGURE 7 is a view similar to FIGURES 2 and 3 of an alternative method of winding a section of bushings, and FIGURE 8 is a view similar to FIGURE 7 of an alternative method of consolidating the bushing.

In the embodiment of FIGURE 1, a high-voltage electrical bushing insulator is manufactured by spirally winding simultaneously onto a rotating mandrel 10 a sheet of absorbent paper 11 and a sheet of flexible synthetic resin film 12 in the dry state, the film 12 when heated constituting an adhesive and being spirally wound directly beneath the paper sheet 11 so that it is interposed between adjacent turns of the spiral winding 13 of the paper sheet on the mandrel 10. Three pressure rollers 14, 15 and 16 heated to 180° C. are distributed around the mandrel 10 at equal angular spacings and are loaded radially towards the mandrel so that they will bear against the winding 13 as it builds up and will heat the resin adhesive film 12 as it enters the spiral winding beneath the outer turn of the paper sheet 11, causing the two faces of the film 12 to bond to the opposed faces of the turns of the paper winding 13 above and below the film. The pressure applied to the exterior of the winding 13 by each roller 14, 15 and 16 may be in the region of 150 p.s.i.

The paper sheet 11 is drawn from a rotatably-mounted roll 18 and passes around and in contact with a drying roller 19 heated to 100° C., by which the paper is subject to a preliminary drying immediately before winding. From the drying roller 19 the paper sheet 11 passes around an unheated guide roller 20 from which it is led partially around one of the heated pressure rollers, 16, and passes between the roller 16 and the mandrel 10 onto the winding 13, which is progressively built up on the rotating mandrel 10. The sheet of resin film 12 is drawn from a rotatably-mounted storage roll 21 and passes partially around the unheated guide pulley 20 on top of the paper sheet 11. The film 12 passes with the paper sheet 11 beneath the heated pressure roller 16 and is led into the winding 13 beneath the paper sheet 11 as the mandrel 10 is rotated, the film 12 melting at least partially as it passes beneath the heated pressure rollers 14, 15 and 16 so that it will bond the layers of the winding 13 together. After the winding 13 has been completed and heat-bonded by the three heated pressure rollers 14, 15 and 16, no further heat processing of the completed winding is required and the mandrel 10 can be removed, unless it is to be an electrical conductor extending through the bushing constituted by the winding 13.

The paper sheet 11 may comprise any suitable grade of absorbent electrical paper, but one of the following three varieties of Kraft paper produced by the sulphate process and having the following properties are preferred:

|  | Variety I | Variety II | Variety III |
| --- | --- | --- | --- |
| Substance, g./m.² | 50–58 | ¹ 70 | 50–59 |
| Thickness, mm. | 0.068–0.080 | ² 0.089 | 0.076–0.078 |
| Porosity (Romans), cc. | 20–50 | ≤10 | ≤10 |
| pH of aqueous extract | 7.0–8.5 | 7.0–8.5 | 8.0–8.5 |
| Conductivity of aqueous extract, μ mho/cm.(max.) | 22 | 22 | 7.74 |
| Electric strength at 90° C., kv./cm | 70 | ≤90 | 87.7–92.25 |
| Ultimate tensile (dried paper) strength (normal to surface), lb./in.² | 400 | 470 | 460 |
| Paper extension (dried), percent | 2–3 | 2–3 | 7–10 |

¹ ±7½%.   ² ±11%.

The resin adhesive film 12 comprises a dry, flexible sheet of phenoxy resin extruded in film form to a thickness between 0.0005" and 0.0015". For example one of the phenoxy resin films sold by Bakelite Limited under the identifying symbols PRDA 8060, PRDA 8030, PRDA 8160, PKDA 8500 and PRDA 8080 may be used, all of which have the repeating molecular structure shown above and are basically thermoplastic resins but exhibit good film-retaining qualities when heated, together with certain of the characteristics of thermosetting resins. All these phenoxy resins have a high molecular weight, approximately 30,000, and in addition to exhibiting excellent adhesion to paper they also have the characteristic that they will not penetrate substantially into the thickness of the paper winding during the heat-bonding operation performed by the heated rollers.

The thickness of paper left unimpregnated and free of resin in each turn of the completed winding 13, which unimpregnated paper serves to absorb the stresses produced by the curing and cooling contractions of the resin, should be

|  | mm. |
| --- | --- |
| For paper— | |
| I | 0.044 to 0.060 |
| II | 0.060 to 0.070 |
| III | 0.044 to 0.062 |

If electrically-conducting inserts are required in the wall of the housing for capacitance grading purposes, sheets of aluminium foil may be incorporated between selected turns of the winding 13 during the winding process. The phenoxy resins referred to have the property of good adhesion to aluminium as well as to paper, so that the foils will be excellently located and bonded by the resin film in their required final positions.

In the embodiment of FIGURES 2 to 6 the invention is applied to the manufacture of a longitudinally curved or angled insulating bushing for use at high voltages.

A dry flexible tape 30 of phenoxy resin film mounted on a reel 31 is wound helically under tension from the reel 31 on to a prepared conductor or other former 32 of the required angled or curved shape. The reel 31 is passed repeatedly around the conductor 32 in known manner to form one or more helically-wound layers of the resin tape. The tape 30 is either butt-lapped at its edges during the winding to form a single layer of resin at a time on the conductor, as shown in FIGURE 2, or it is overlapped during the winding so as to form a group of several superimposed layers of the resin film at a time, before the axial winding direction is reversed.

Electrical grade creped or plain paper in the form of a tape 34, also mounted on a reel 35, is then wound similarly under tension over the resin layer or layers, as shown in FIGURE 3, the paper tape being once again butt-lapped or overlapped giving one or several layers of helically-wound paper. The two winding stages are then repeated, a resin layer or group of layers 36 and a paper layer or group of layers 37 being wound alternately one on the other as shown in cross-section in FIGURE 5 until a sufficient thickness of the combined insulation has been built up, as shown in FIGURE 4.

During the winding one or more metallic layers 38 are introduced into the insulation at predetermined radial spacings from the conductor or former 32, to act as capacitance layers for voltage grading purposes. These metallic layers 38 may be formed either by winding metal foil from a reel into the insulation winding, or by fitting previously tailored sheets of metal or metallic material onto the surface of the insulation during the formation of the winding.

After the insulation has reached the required total thickness, a covering 39 is applied to the winding in order to contain the insulation and to subject it to pressure during the consolidation stages of the process which now follow.

Thus after the cover has been applied to the winding, the wound assembly 40 is placed in a heated tank indicated diagrammatically at 41 in FIGURE 6. The tank 41 is evacuated to a vacuum of 0.1 to 0.3 mm. of mercury and is heated to a temperature of 180° C. The assembly 40 is kept in the evacuated and heated tank 41 for a sufficient time to cause the insulation to become consolidated to a solid mass adhering to the conductor 32, the layers of the winding becoming bonded together by the resin. After consolidation is completed, the bushing 40 is removed from the tank and the outer covering 39 can be removed when cold.

In a modification illustrated in FIGURE 7, the dry resin tape 30 and the paper tape 34 are wound simultaneously, from separate reels 31 and 35, onto the conductor or former 32, the metallic layers being formed or introduced in the same manner as previously described. Alternatively the resin tape 30 and paper tape 34 may be wound simultaneously from a single reel on which they are interleaved with one another.

After the required thickness of insulation has been built up by simultaneous winding of the resin and paper tapes, the consolidation process is performed in the manner previously described.

In another modification of the invention, the insulation is built up by forming a winding in either of the ways previously described with reference to FIGURES 2 to 6 or to FIGURE 7, and covering the winding. The covered assembly 40 is then placed in a heated tank for consolidation, but the tank instead of being evacuated is pressurised with a gas, preferably an electro-negative gas. The insulation is thus consolidated under the heat and gas pressure in the tank. After consolidation is completed the assembly 40 is removed from the tank and allowed to cool, after which the outer cover can be removed.

The final modification which will be described also involves a variation of the consolidation process, and is illustrated diagrammatically in FIGURE 8. In this case the winding is built up from paper tape 34, and phenoxy resin tape 40 wound simultaneously as described above with reference to FIGURE 7, and heat and pressure are applied to the winding 40 during its formation by means of spring-loaded heated pressure rolls 50, 51. These rolls 50 and 51 are mounted on a carrier 52 which follows the motion of the reels 31 and 35 from which the resin and paper tapes 30 and 34 are being unwound around and along the contour of the insulation which is being built up. The heated rolls 50 and 51 are placed so that they contact and bear resiliently against the surface of the winding both in front and behind the point of arrival of the new tapes 30 and 34 from the unwind reels onto the winding; or both of the rolls may be positioned to precede, or both to follow, the unwind reels. The pressure rolls 50 and 51 consolidate and fuse the insulation to a hot mass whilst the insulation is actually being built up as a winding, so that when the required thickness of insulation is reached the bushing 40 is complete and no further consolidation treatment in a heated tank is required. Metallic layers may be introduced into the winding during its formation in the manner previously described and at the levels required.

It will be understood that in all the specific embodiments described above, the paper tape or sheet may be either plain paper or creped paper. When creped paper tape is used, sufficient tensioning is applied to the tape during the winding to ensure that a proportion of the creping is removed by extension of the tape.

In the various embodiments of FIGURES 2 to 6, 7 and 8 the specifications of the paper and resin used are as given above with reference to FIGURE 1.

However it will be understood that in all the various embodiments of FIGURES 1 to 8, the adhesive resin sheet or tape employed in the manufacture of the bushing or other insulator or insulation as described, instead of being a phenoxy resin, may be of some other high-molecular-weight resin in sheet or tape form having good adhesion to paper and preferably having the property that it is not absorbed into the full thickness of the paper during the bonding and consolidation operation.

What we claim as our invention and desire to secure by Letters Patent is:

1. A method of making solid resin-bonded wound-paper high-voltage insulation, comprising winding onto a former alternate layers respectively of electrically insulating paper and of a dry flexible film of phenoxy resin, the suceeding paper and resin film layers being superimposed radially one upon another to build up the insulation to the required solid radial thickness, and consolidating the winding by applying heat and pressure to it to cause the resin film to melt and bond the adjacent paper layers together.

2. A method of making a solid resin-bonded wound-paper high-voltage insulator which comprises winding simultaneously onto a former in a spiral winding a length of electrically insulating paper sheet and a length of dry flexible phenoxy resin film superimposed one upon another so as to form a double thickness for winding, the paper and resin forming alternate layers of the spiral winding as it is built up to the required solid radial thickness of insulation, and consolidating the winding as it is progressively built up by applying heat and pressure locally to the exterior of the winding simultaneously with the winding operation to cause the resin film to melt and bond the adjacent wound paper layers together.

3. A method as claimed in claim 1 for making insulation of angled form in which the former is of angular construction.

4. A method as claimed in claim 1 in which the resin and paper are in sheet form and are applied simultaneously in a spiral winding.

5. A method as claimed in claim 1 in which the resin and paper are in tape form and are wound helically.

6. A method as claimed in claim 5 in which the resin and paper tapes are wound simultaneously one beneath the other.

7. A method as claimed in claim 1 in which the resin and paper are in tape form and are wound alternately in successive layers.

8. A method as claimed in claim 2, in which heated pressure rolls are applied locally in selected areas of contact to the exterior of the winding simultaneously with the formation of the winding, the areas of contact of the pressure rolls being advanced progressively over the surface of the winding as the winding is progressively built up.

9. A method as claimed in claim 1 in which to consolidate the insulation the completed winding of alternate layers of resin and paper is enclosed in an external casing and consolidated by being baked in a heated vessel.

10. A method as claimed in claim 9 in which the baking operation is performed under a super-atmospheric pressure in the heated vessel.

11. A method as claimed in claim 9 in which the baking operation is performed under a vacuum in the vessel.

12. A method as claimed in claim 1 in which metallic inserts are interposed in the insulator at selected radial positions between adjacent turns during the winding thereof.

13. A method as claimed in claim 1 in which the paper is crepe paper.

References Cited
UNITED STATES PATENTS

| | | | |
|---|---|---|---|
| 3,185,759 | 5/1965 | Sheehan. | |
| 2,922,734 | 1/1960 | Kohn et al. | 156—190 X |
| 2,516,864 | 8/1950 | Gilmore et al. | 156—143 |
| 2,995,688 | 8/1961 | Rosenberg | 317—260 X |
| 2,735,970 | 2/1956 | Peck et al. | |
| 2,181,035 | 11/1939 | White | 156—190 X |

FOREIGN PATENTS 562,667  7/1944  Great Britain.

EARL M. BERGERT, *Primary Examiner.*

PHILIP DIER, *Examiner.*